United States Patent
Lee et al.

(10) Patent No.: US 11,628,715 B2
(45) Date of Patent: Apr. 18, 2023

(54) SHIFT CONTROL METHOD FOR AMT VEHICLE

(71) Applicants: HYUNDAI MOTOR COMPANY, Seoul (KR); KIA CORPORATION, Seoul (KR)

(72) Inventors: Ah Ram Lee, Bucheon-si (KR); Kwon Su Shin, Incheon (KR); Jae Joon Lee, Gwacheon-si (KR); Jong Sool Park, Hwaseong-si (KR); Jin Young Hwang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/339,266

(22) Filed: Jun. 4, 2021

(65) Prior Publication Data

US 2022/0134862 A1 May 5, 2022

(30) Foreign Application Priority Data

Nov. 3, 2020 (KR) .................. 10-2020-0145399

(51) Int. Cl.
*B60K 1/02* (2006.01)
*F16H 37/08* (2006.01)
(Continued)

(52) U.S. Cl.
CPC .............. *B60K 6/365* (2013.01); *B60K 1/02* (2013.01); *F16H 3/727* (2013.01);
(Continued)

(58) Field of Classification Search
CPC ............. F16H 61/04; F16H 2061/0433; F16H 37/08–0826
See application file for complete search history.

(56) References Cited

U.S. PATENT DOCUMENTS 5,775,449 A   7/1998  Moroto et al.
6,958,028 B2  10/2005 Janson et al.
(Continued)

FOREIGN PATENT DOCUMENTS

CN   104948716 A    9/2015
DE   102008002380 A1  12/2009
(Continued)

OTHER PUBLICATIONS

Office Action issued in related U.S. Appl. No. 17/243,995, dated Jun. 14, 2022 (8 pages).
(Continued)

*Primary Examiner* — Ernesto A Suarez
*Assistant Examiner* — Lillian T Nguyen
(74) *Attorney, Agent, or Firm* — Lempia Summerfield Katz LLC

(57) ABSTRACT

A shift control method for an automated manual transmission (AMT) of a vehicle includes: when a shift operation is started, a torque of the second motor is increased so that a change in an output torque of the output shaft due to a change in a torque of the first motor is minimized while the torque of the first motor is being decreased. According to the shift control method, the increased torque of the second motor is maintained to be constant while controlling transmission release, speed synchronization, and transmission coupling. After the control over the transmission coupling is completed, the torque of the second motor is controlled so that the output torque of the output shaft follows a predetermined target torque while the torque of the first motor is controlled to be increased.

12 Claims, 13 Drawing Sheets

(51) Int. Cl.
*B60K 6/365* (2007.10)
*F16H 3/72* (2006.01)
*F16H 61/04* (2006.01)

(52) U.S. Cl.
CPC . *F16H 37/0826* (2013.01); *F16H 2061/0433* (2013.01); *F16H 2200/2005* (2013.01)

(56) References Cited

U.S. PATENT DOCUMENTS

| | | | |
|---|---|---|---|
| 7,261,670 B2 * | 8/2007 | Endo | B60L 15/2009 |
| | | | 477/3 |
| 7,469,609 B2 | 12/2008 | Baldwin | |
| 8,051,732 B2 | 11/2011 | Gitt | |
| 8,257,213 B2 | 9/2012 | Komada et al. | |
| 9,260,109 B2 | 2/2016 | Tanaka et al. | |
| 9,346,462 B2 | 5/2016 | Park | |
| 9,528,583 B2 | 12/2016 | Lubke et al. | |
| 10,081,240 B2 | 9/2018 | Lee et al. | |
| 10,495,191 B1 | 12/2019 | Eo et al. | |
| 11,181,174 B2 | 11/2021 | Kim et al. | |
| 2002/0088291 A1 | 7/2002 | Bowen | |
| 2002/0189397 A1 * | 12/2002 | Sakamoto | B60W 10/10 |
| | | | 74/661 |
| 2003/0100395 A1 | 5/2003 | Hiraiwa | |
| 2005/0164827 A1 * | 7/2005 | Beaty | B60W 10/02 |
| | | | 477/3 |
| 2005/0204837 A1 | 9/2005 | Janson et al. | |
| 2006/0025272 A1 | 2/2006 | Pelouch | |
| 2007/0149334 A1 | 6/2007 | Holmes et al. | |
| 2008/0108467 A1 | 5/2008 | Hiraki et al. | |
| 2008/0194369 A1 | 8/2008 | Boutou et al. | |
| 2008/0200296 A1 | 8/2008 | Holmes | |
| 2009/0011887 A1 | 1/2009 | Komada et al. | |
| 2009/0151491 A1 | 6/2009 | Tabata et al. | |
| 2009/0166107 A1 * | 7/2009 | Besnard | B60W 20/00 |
| | | | 180/65.6 |
| 2010/0051360 A1 | 3/2010 | Oba et al. | |
| 2010/0160103 A1 | 6/2010 | Holmes | |
| 2011/0184612 A1 | 7/2011 | Fujii et al. | |
| 2012/0316738 A1 | 12/2012 | Teslak et al. | |
| 2014/0349799 A1 | 11/2014 | Kaltenbach et al. | |
| 2015/0068336 A1 | 3/2015 | Peterson et al. | |
| 2016/0167639 A1 | 6/2016 | Hori et al. | |
| 2016/0312857 A1 | 10/2016 | Wechs | |
| 2017/0009862 A1 | 1/2017 | Gumpoldsberger et al. | |
| 2017/0159779 A1 | 6/2017 | Hwang et al. | |
| 2017/0282700 A1 | 10/2017 | Bergquist et al. | |
| 2018/0099561 A1 | 4/2018 | Xu et al. | |
| 2019/0118635 A1 | 4/2019 | Hwang et al. | |
| 2019/0360558 A1 | 11/2019 | Eo et al. | |
| 2020/0047602 A1 | 2/2020 | Chae et al. | |

FOREIGN PATENT DOCUMENTS

| | | |
|---|---|---|
| DE | 102018222258 A1 | 6/2020 |
| DE | 102019209985 A1 | 1/2021 |
| KR | 20080087907 A | 10/2008 |
| KR | 10-2013-0177184 A | 10/2013 |
| KR | 10-2014-0118028 A | 10/2014 |
| KR | 20160051051 A | 5/2016 |
| KR | 20190066675 A | 6/2019 |
| KR | 20190134147 A | 12/2019 |
| WO | 2021073748 A1 | 4/2021 |

OTHER PUBLICATIONS

Notice of Allowance cited in corresponding Korean application No. 10-2020-0145399; dated Apr. 19, 2022; 10 pp.
Office Action issued in related U.S. Appl. No. 17/531,454, dated Oct. 25, 2022.
Office Action issued in related U.S. Appl. No. 16/882,299, dated Jun. 4, 2021.
Office Action issued in related U.S. Appl. No. 17/531,475, dated Dec. 28, 2022.

* cited by examiner

FIG. 2

| Shift Position | S2 | | S3 | | S1 | |
|---|---|---|---|---|---|---|
| | D4 | D3 | CS | C | D2 | D1 |
| 1st Shift Position | ● | | ● | | | ● |
| 2nd Shift Position | ● | | ● | | ● | |
| 3rd Shift Position | | ● | ● | | ● | |
| 4th Shift Position | | ● | | ● | | ● |
| 5th Shift Position | ● | | | ● | | ● |
| 6th Shift Position | ● | | | ● | ● | |

SHIFT CONTROL METHOD FOR AMT VEHICLE

CROSS REFERENCE TO RELATED APPLICATION

This application claims priority to and the benefit of Korean Patent Application No. 10-2020-0145399, filed on Nov. 3, 2020, the entire contents of which are incorporated herein by reference.

FIELD

The present disclosure generally relates to a shift control method for a vehicle and, more particularly, to a shift control technology for a vehicle on which an automated manual transmission (AMT) is mounted.

BACKGROUND

The statements in this section merely provide background information related to the present disclosure and may not constitute prior art.

Although an AMT uses a shift mechanism that is the same as a typical manual transmission, the AMT enables the operation of a clutch and the shift operation to be automatically performed by a clutch actuator and a shift actuator, which are provided separately, thereby improving driver convenience.

However, we have discovered that since the shift operation of the AMT is automatically performed by the actuators depending on driving situations, unlike the manual shift operation performed by the intention of a driver, torque interruption is essentially accompanied with the shifting process such that it may cause the feeling of shifting to be unpleasant and cause degradations in the power performance of a vehicle.

The foregoing is intended merely to aid in the understanding of the background of the present disclosure, and is not intended to mean that the present disclosure falls within the purview of the related art that is already known to those skilled in the art.

SUMMARY

The present disclosure proposes a shift control method for an AMT vehicle (i.e. a vehicle on which an AMT is mounted). In particular, the method is able to inhibit or prevent torque interruption during gear shifting of the AMT so as to provide excellent feeling of shifting and prevent degradations in the power performance of the AMT vehicle, thereby improving the merchantability of the AMT vehicle.

In one aspect of the present disclosure, there is provided a shift control method for an AMT of a vehicle including a first motor, a second motor, and a planetary gear unit, in which the first motor supplies power to a first rotating element of the planetary gear unit, the second motor supplies power to the first rotating element or a second rotating element of the planetary gear unit, the second rotating element being coupled to an output shaft, and power output from the first motor and power output from the second motor are combined together via the planetary gear unit. The shift control method may include: when a shift operation is started, increasing torque of the second motor so that a change in output torque of the output shaft due to a change in torque of the first motor is minimized while decreasing the torque of the first motor; maintaining the increased torque of the second motor to be constant while performing control over transmission release, speed synchronization, and transmission coupling; and after the control over the transmission coupling is completed, controlling the torque of the second motor so that the output torque of the output shaft follows predetermined target torque while controlling the torque of the first motor to be increased.

The target torque that the output torque of the output shaft follows may be maintained to be a constant value from previous steps.

The target torque that the output torque of the output shaft follows may be late-increasing target torque that is gradually increased.

According to another aspect of the present disclosure, there is provided a shift control method for an AMT including a first motor, a second motor, and a planetary gear unit, in which the first motor supplies power to a first rotating element of the planetary gear unit, the second motor supplies power to the first rotating element or a second rotating element of the planetary gear unit, the second rotating element being coupled to an output shaft, and power output from the first motor and power output from the second motor are combined together via the planetary gear unit. The shift control method may include: when a shift operation is started, increasing torque of the second motor so that output torque of the output shaft follows predetermined early-increasing target torque while decreasing torque of the first motor; maintaining the increased torque of the second motor to be constant while performing control over transmission release, speed synchronization, and transmission coupling; and after the control over the transmission release is completed, controlling the torque of the second motor so that the output torque of the output shaft follows predetermined target torque while controlling the torque of the first motor to be increased.

The target torque that the output torque of the output shaft follows may be maintained to be a constant value from previous steps.

The target torque that the output torque of the output shaft follows may be late-increasing target torque that is gradually increased.

The early-increasing target torque may be set to be greater than or equal to maximum torque of the second motor.

The late-increasing target torque may be set to be greater than or equal to maximum torque of the second motor.

Even in a case that the late-increasing target torque is set to be greater than the maximum torque of the second motor, the second motor may be controlled by the maximum torque thereof.

According to another aspect of the present disclosure, there is provided a shift control method for an AMT including a first motor, a second motor, and a planetary gear unit, in which the first motor supplies power to a first rotating element of the planetary gear unit, the second motor supplies power to the first rotating element or a second rotating element of the planetary gear unit, the second rotating element being coupled to an output shaft, and power output from the first motor and power output from the second motor are combined together via the planetary gear unit. The shift control method may include: when a shift operation is started, increasing torque of the first motor so that a change in output torque of the output shaft due to a change in torque of the second motor is minimized while decreasing the torque of the second motor; maintaining the increased torque of the first motor to be constant while performing control over transmission release, speed synchronization, and transmission coupling; and after the control over the transmission release is completed, controlling the torque of the first motor so that the output torque of the output shaft follows predetermined target torque while controlling the torque of the second motor to be increased.

The target torque that the output torque of the output shaft follows may be maintained to be a constant value from previous steps.

The target torque that the output torque of the output shaft follows may be late-increasing target torque that is gradually increased.

According to another aspect of the present disclosure, there is provided a shift control method for an AMT including a first motor, a second motor, and a planetary gear unit, in which the first motor supplies power to a first rotating element of the planetary gear unit, the second motor supplies power to the first rotating element or a second rotating element of the planetary gear unit, the second rotating element being coupled to an output shaft, and power output from the first motor and power output from the second motor are combined together via the planetary gear unit. The shift control method may include: when a shift operation is started, increasing torque of the first motor so that output torque of the output shaft follows predetermined early-increasing target torque while decreasing torque of the second motor; maintaining the increased torque of the first motor to be constant while performing control over transmission release, speed synchronization, and transmission coupling; and after the control over the transmission release is completed, controlling the torque of the first motor so that the output torque of the output shaft follows predetermined target torque while controlling the torque of the second motor to be increased.

The target torque that the output torque of the output shaft follows may be maintained to be a constant value from previous steps.

The target torque that the output torque of the output shaft follows may be late-increasing target torque that is gradually increased.

The shift control method for an AMT vehicle according to the present disclosure may inhibit or prevent torque interruption during gear shifting of the AMT vehicle so as to provide excellent feeling of shifting and prevent degradations in the power performance of the AMT vehicle, thereby improving the merchantability of the AMT vehicle.

In addition, the output torque of the output shaft may be maintained to be constant or be increased while a shift operation is being performed, thereby obtaining superior acceleration response and maximizing the power performance of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a table illustrating operation modes of the AMT illustrated in FIG. 1;

Figure 1:
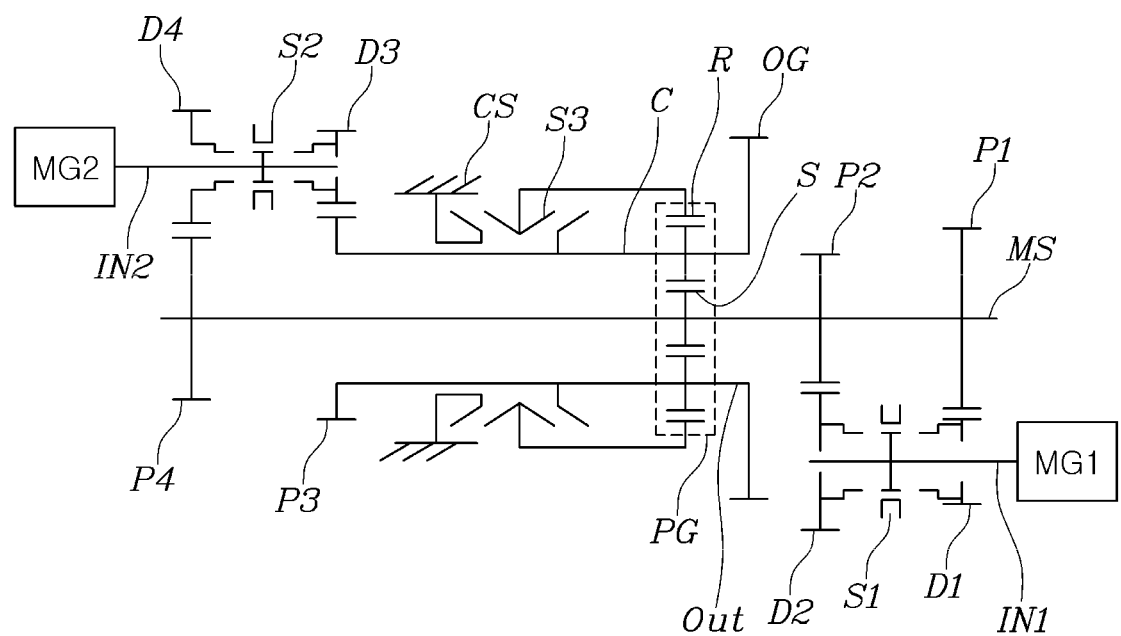
FIG. 1 is a diagram illustrating the structure of an AMT to which the present disclosure is applicable.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagram illustrating the structure of an AMT to which the present disclosure is applicable, with two power sources being connected to the AMT. Here, the two power sources are a first motor MG1 and a second motor MG2.

The AMT is configured such that the AMT may supply power from the first motor MG1 to a planetary gear unit PG by changing the gear ratio and change a path on which power is supplied from the second motor MG2 to the planetary gear unit PG, so that the power is output to an output shaft OUT connected to the planetary gear unit PG.

The planetary gear unit PG includes first, second, and third rotating elements. In FIG. 1, the first rotating element corresponds to a sun gear S, the second rotating element corresponds to a carrier C, and the third rotating element corresponds to a ring gear R.

That is, the planetary gear unit PG includes the sun gear S, the carrier C, and the ring gear R. The first motor MG1 is configured such that the first motor MG1 may supply power to the sun gear S by changing the gear ratio using a first transmission unit. The second motor MG2 is configured such that the second motor MG2 may change the path, on which power is supplied, to the carrier C or the sun gear S using a second transmission unit. The ring gear R is configured so as to be movable between a position in which the ring gear R is directly connected to the carrier C via the third transmission unit S3 and a position in which the ring gear R is fixed to the transmission casing CS.

The output shaft OUT is directly connected to the carrier C, an output gear OG is integrally provided on the output shaft OUT, and a middle shaft MS is provided on the sun gear S.

The first motor MG1 is connected to a first input shaft IN1. A first driving gear D1 and a second driving gear D2 are rotatably connected to the first input shaft IN1. A first driven gear P1 engaged with the first driving gear D1 and a second driven gear P2 engaged with the second driving gear D2 are provided on the middle shaft MS. A first synchronization unit S1 able to directly connect the first driving gear D1 or the second driving gear D2 to the first input shaft IN1 is provided on the first input shaft IN1.

Here, the first synchronization unit S1, the first driving gear D1, the second driving gear D2, the first driven gear P1, second driven gear P2, and the like constitute the first transmission unit.

The second motor MG2 is connected to a second input shaft IN2. A third driving gear D3 and a fourth driving gear D4 are rotatably disposed on the second input shaft IN2. A third driven gear P3 engaged with the third driving gear D3 and a fourth driven gear P4 engaged with the fourth driving gear D4 are provided on the middle shaft MS. A second synchronization unit S2 able to directly connect the third driving gear D3 or the fourth driving gear D4 to the second input shaft IN2 is provided on the second input shaft IN2.

Here, the second synchronization unit S2, the third driving gear D3, the fourth driving gear D4, the third driven gear P3, the fourth driven gear P4, and the like constitute the second transmission unit.

The third transmission unit S3 is configured such that the third transmission unit S3 may slide in the axial direction of the middle shaft MS so as to directly connect the ring gear R to the carrier C or the transmission casing CS.

Each of the first synchronization unit S1 of the first transmission unit, the second synchronization unit S2 of the second transmission unit, and the third transmission unit S3 is operated by a corresponding shift actuator. Such shift actuators are controlled by a controller receiving information, such as a vehicle speed, a displacement of the accelerator pedal, and the like.

In addition, the controller may be configured such that the controller controls the torque and the speed of the first motor MG1 and the second motor MG2.

Referring to FIG. 2, the AMT is configured such that the AMT may realize six shift positions, i.e. first to sixth shift positions, depending on the operating states of the first synchronization unit S1, the second synchronization unit S2, and the third transmission unit S3.

Referring to FIGS. 3 to 6, a shift control method for an AMT of a vehicle according first and second forms of the present disclosure includes: step S11 of, when a shift operation is started, increasing the torque of the second motor MG2 so that a change in output torque of the output shaft OUT due to a change in the torque of the first motor MG1 is minimized while decreasing the torque of the first motor MG1; step S12 of maintaining the increased torque of the second motor MG2 to be constant while performing control over transmission release, speed synchronization, and transmission coupling; and a step of, after the control over the transmission coupling is completed, controlling the torque of the second motor MG2 so that the output torque of the output shaft OUT follows predetermined target torque while controlling the torque of the first motor MG1 to be increased.

In the first form, the target torque that the output torque of the output shaft OUT follows is continuously maintained to be a constant value from previous steps. In contrast, in the second form, the target torque that the output torque of the output shaft OUT follows is predetermined late-increasing target torque that is gradually increased.

That is, the first form is configured such that the change in the output torque of the output shaft OUT due to the change in the torque of the first motor MG1 is minimized.

Thus, the first form includes step S13 of decreasing the torque of the second motor MG2 in order to maintain the output torque of the output shaft OUT to be the constant value while increasing the torque of the first motor MG1 as described above.

Figure 4:
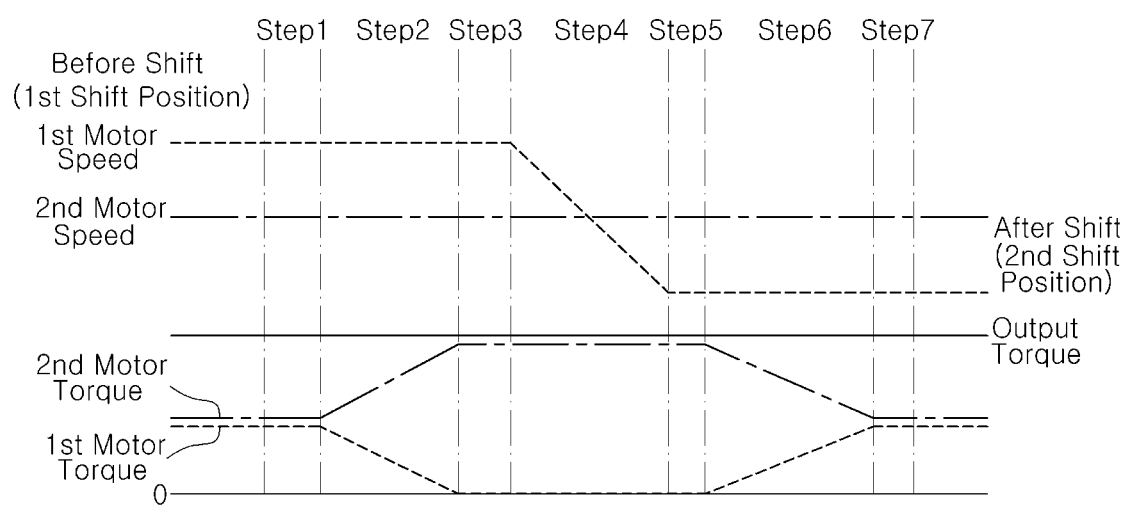
FIG. 4 is a graph illustrating the shift control method for an AMT according to the first form of the present disclosure.

For example, in the case of a power-on 1-2 upshift performed in a situation in which a driver has pressed the accelerator pedal, the shift operation may be composed of a total of seven (7) steps as illustrated in FIG. 4.

The first shift position is a position in which the first driving gear D1 is directly connected to the first input shaft IN1 by the first synchronization unit S1, the fourth driving gear D4 is directly connected to the second input shaft IN2 by the second synchronization unit S2, and the ring gear R is fixed to the transmission casing CS by the third transmission unit S3.

In order to shift from the above-described first shift position to the second shift position, the first synchronization unit S1 is desired to release the first driving gear D1 from the first input shaft IN1 and directly connect the second driving gear D2 to the first input shaft IN1.

In Step 1, the shift operation is started in response to generation of a shift command indicating a shift from the first shift position to the second shift position.

In Step 2, cooperative control of increasing the torque of the second motor MG2 to inhibit or compensate for a decrease in torque output via the output shaft OUT in response to the change in the torque of the first motor MG1 while decreasing the torque of the first motor MG1 is performed, so that the first synchronization unit S1 releases the first driving gear D1 from the first input shaft IN1.

In Step 3, when the torque of the first motor MG1 is sufficiently decreased, the first synchronization unit S1 releases the first driving gear D1 from the first input shaft IN1.

Here, the torque of the second motor MG2 is maintained to be constant, so that the output torque of the output shaft OUT is maintained to be constant.

In Step 4, when the releasing of the first driving gear D1 from the first input shaft IN1 is completed and the first driving gear D1 is in the neutral position, the speed of the first motor MG1 is reduced in order to synchronize the speed of the second driving gear D2 and the speed of the first input shaft IN1.

Here, the torque of the second motor MG2 is maintained to be constant, so that the output torque of the output shaft OUT is maintained to be constant.

In Step 5, when the speed of the first input shaft IN1 is synchronized with the speed of the second driving gear D2, the second driving gear D2 is directly connected to the first input shaft IN1 by the first synchronization unit S1.

Here, the torque of the second motor MG2 is maintained to be constant, so that the output torque of the output shaft OUT is maintained to be constant.

In Step 6, when the coupling between the second driving gear D2 and the first input shaft IN1 is completed, cooperative control of decreasing the torque of the second motor MG2 to reduce or minimize a change in the output torque in response to the change in the torque of the first motor MG1 while increasing the torque of the first motor MG1 is performed.

In Step 7, it may be appreciated that the shift from the first shift position to the second shift position is completed due to the control over the torque of the first motor MG1 and the torque of the second motor MG2 in Step 6.

Thus, it may be regarded that the actual shift operation is performed by the steps from step 2 to Step 6. As illustrated in FIG. 4, the output torque of the output shaft OUT may be continuously maintained to be constant while the shift operation is being performed.

Accordingly, the shift control method may obtain reliable and constant output torque by removing torque interruption that has occurred during the shift operation in the related art so as to improve the feeling of shifting, thereby improving the merchantability of a vehicle.

For reference, the above-described operations of "transmission release," "speed synchronization," and "transmission coupling" correspond to step 3, step 4, and step 5, respectively.

Figure 5:
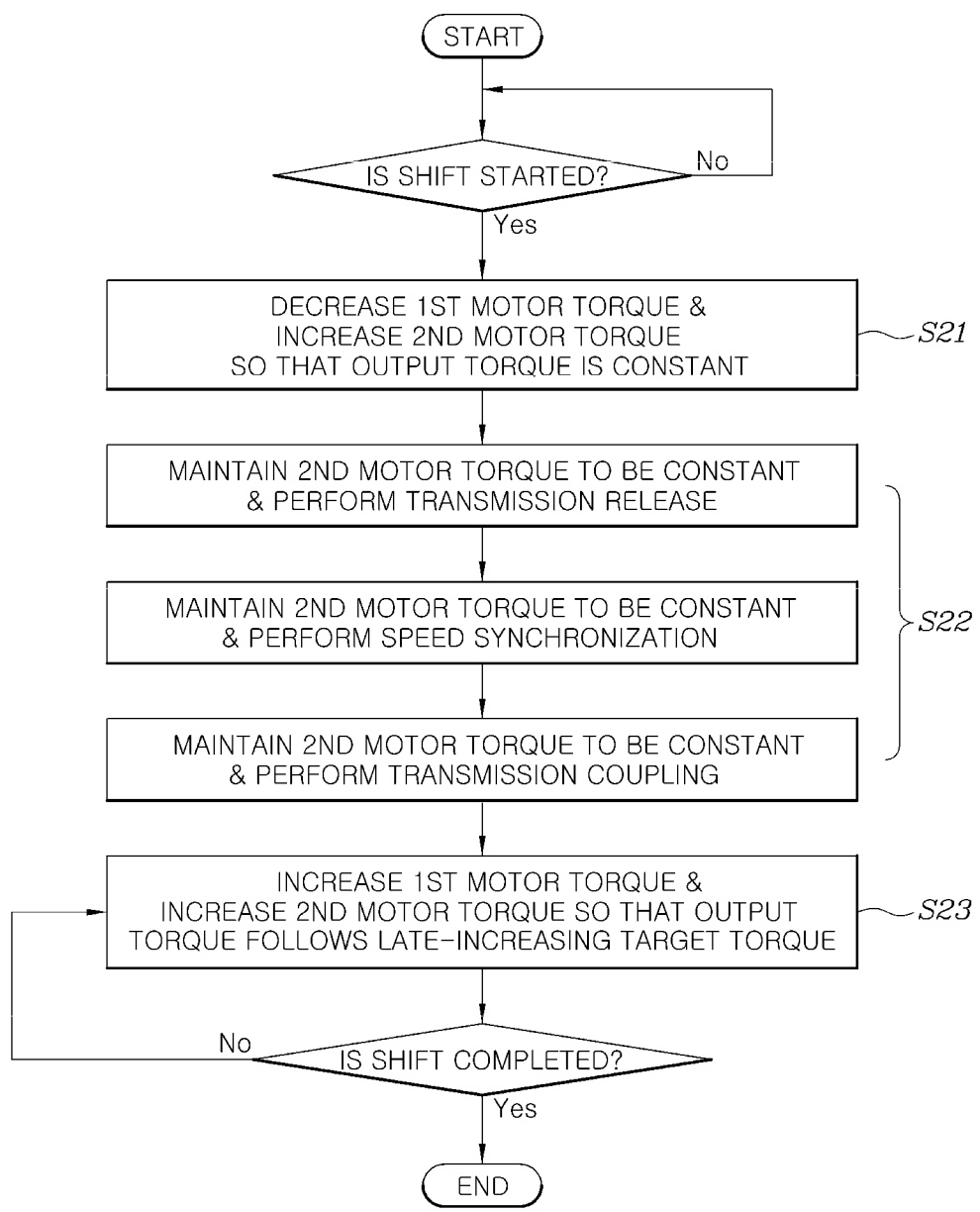
FIG. 5 is a flowchart illustrating a shift control method for an AMT according to a second form of the present disclosure.
Figure 6:
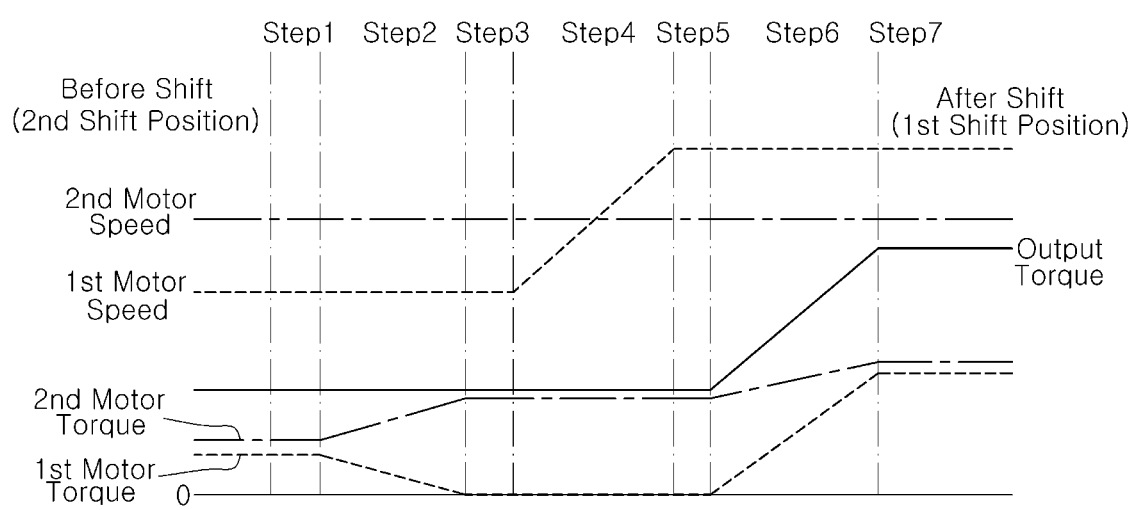
FIG. 6 is a graph illustrating the shift control method for an AMT according to the second form of the present disclosure.
Figure 7:
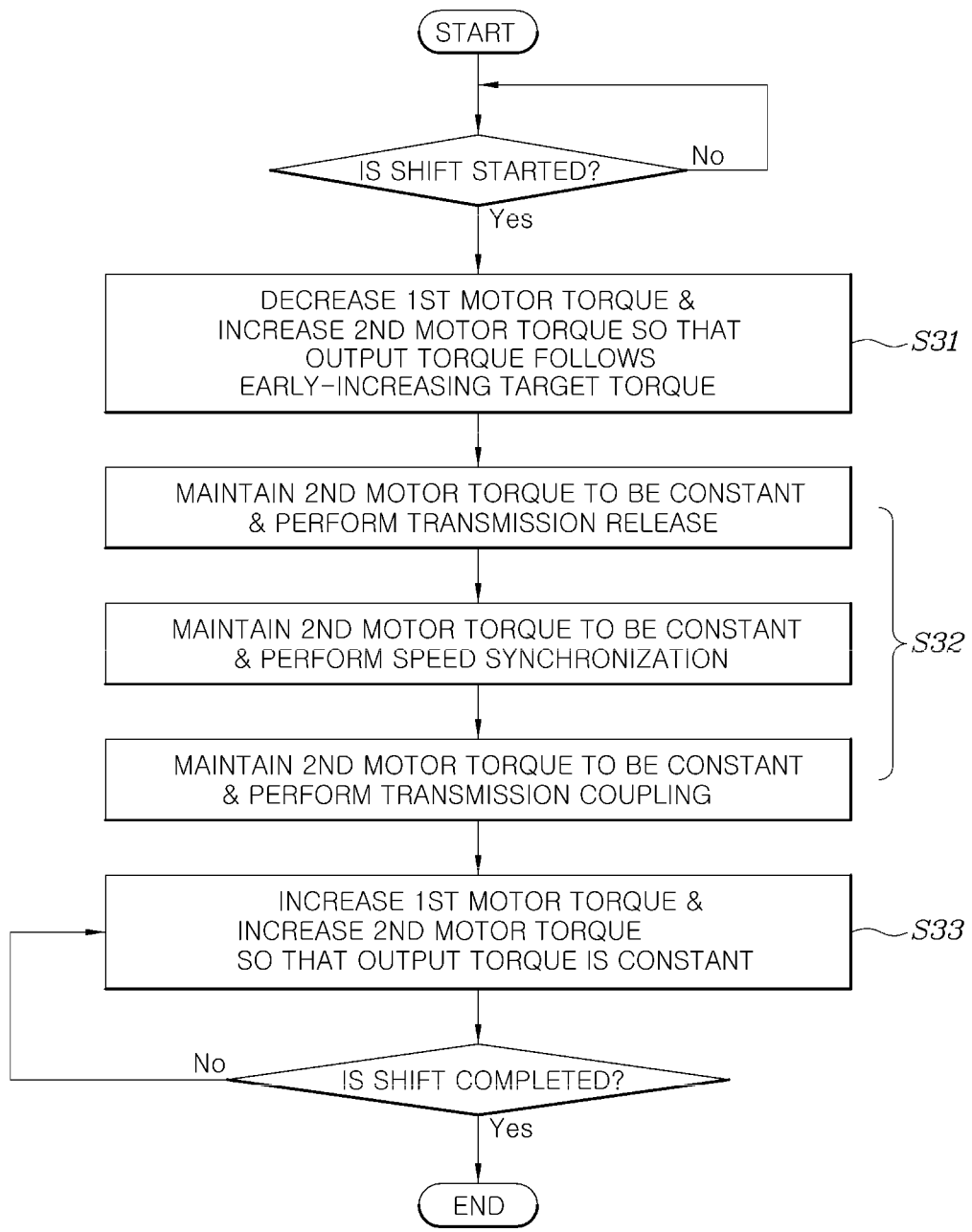
FIG. 7 is a flowchart illustrating a shift control method for an AMT according to a third form of the present disclosure.

Referring to FIGS. 5 and 6, a shift control method for an AMT of a vehicle according to the second form of the present disclosure includes: step S21 of, when a shift operation is started, increasing the torque of the second motor MG2 so that a change in output torque of the output shaft OUT due to a change in the torque of the first motor MG1 is reduced or minimized while decreasing the torque of the first motor MG1; step S22 of maintaining the increased torque of the second motor MG2 to be constant while performing control over transmission release, speed synchronization, and transmission coupling; and step S23 of, after the control over the transmission coupling is completed, controlling the torque of the second motor MG2 so that the output torque of the output shaft OUT follows predetermined late-increasing target torque while controlling the torque of the first motor MG1 to be increased.

For example, a power-on 2-1 downshift performed in a situation in which the driver has pressed the accelerator pedal may be described as being composed of a total of 7 steps as illustrated in FIG. 6.

In Step 1, the shift operation is started in response to generation of a shift command indicating a shift from the second shift position to the first shift position.

In Step 2, cooperative control of increasing the torque of the second motor MG2 to prevent or compensate for a decrease in torque output via the output shaft OUT in response to the change in the torque of the first motor MG1 while decreasing the torque of the first motor MG1 is performed, so that the first synchronization unit S1 releases the second driving gear D2 from the first input shaft IN1.

In Step 3, when the torque of the first motor MG1 is sufficiently decreased, the first synchronization unit S1 releases the second driving gear D2 from the first input shaft IN1.

Here, the torque of the second motor MG2 is maintained to be constant, so that the output torque of the output shaft OUT is maintained to be constant.

In Step 4, when the releasing of the second driving gear D2 from the first input shaft IN1 is completed and the second driving gear D2 is in the neutral position, the speed of the first motor MG1 is increased in order to synchronize the speed of the first driving gear D1 and the speed of the first input shaft IN1.

Here, the torque of the second motor MG2 is maintained to be constant, so that the output torque of the output shaft OUT is maintained to be constant.

In Step 5, when the speed of the first input shaft IN1 is synchronized with the speed of the first driving gear D1, the first driving gear D1 is directly connected to the first input shaft IN1 by the first synchronization unit S1.

Here, the torque of the second motor MG2 is maintained to be constant, so that the output torque of the output shaft OUT is maintained to be constant.

In Step 6, when the coupling between the first driving gear D1 and the first input shaft IN1 is completed, cooperative control of increasing the torque of the first motor MG1 and, simultaneously, increasing the torque of the second motor MG2 so that the output torque of the output shaft OUT follows the late-increasing target torque is performed.

In the present form, differently from the first form, it is possible to increase the output torque to follow the late-increasing target torque instead of remaining constant, thereby further improving the feeling of acceleration of the vehicle.

Accordingly, the late-increasing target torque may be previously designed and set to an appropriate value by a plurality of experiments and analysis, depending on the characteristics of the corresponding vehicle type, so as to increase in proportion to the displacement of the accelerator pedal moved by the driver, the operation acceleration, or the like.

In Step 7, it may be appreciated that the shift from the second shift position to the first shift position is completed due to the control over the torque of the first motor MG1 and the torque of the second motor MG2 in Step 6.

According to the present form, the output torque output shaft OUT remains constant without torque interruption during the power-on downshift of the vehicle but is increased at the final stage of the shift operation. Consequently, the feeling of shifting of the vehicle may be improved and the feeling of acceleration may be obtained, so that the power performance of the vehicle may be significantly improved.

Referring to FIGS. 7 to 10, a shift control method for an AMT for a vehicle according to third and fourth forms of the present disclosure includes: step S31 of, when a shift operation is started, increasing the torque of the second motor MG2 so that output torque of the output shaft OUT follows predetermined early-increasing target torque while decreasing the torque of the first motor MG1; step S32 of maintaining the increased torque of the second motor MG2 to be constant while performing control over transmission release, speed synchronization, and transmission coupling; and a step of, after the control over the transmission coupling is completed, controlling the torque of the second motor MG2 so that the output torque of the output shaft OUT follows predetermined target torque while controlling the torque of the first motor MG1 to be increased. (The early-increasing target torque refers to torque, the value of which is increased in an early stage.)

In the third form, the target torque that the output torque of the output shaft OUT follows is continuously maintained to be a constant value from previous steps. In contrast, in the fourth form, the target torque that the output torque of the output shaft OUT follows is predetermined late-increasing target torque that is gradually increased.

That is, the third form is configured such that the change in the output torque of the output shaft OUT due to the change in the torque of the first motor MG1 is reduced or minimized.

Thus, the third form includes step S33 of decreasing the torque of the second motor MG2 in order to maintain the output torque of the output shaft OUT to be the constant value while increasing the torque of the first motor MG1 as described above.

Figure 8:
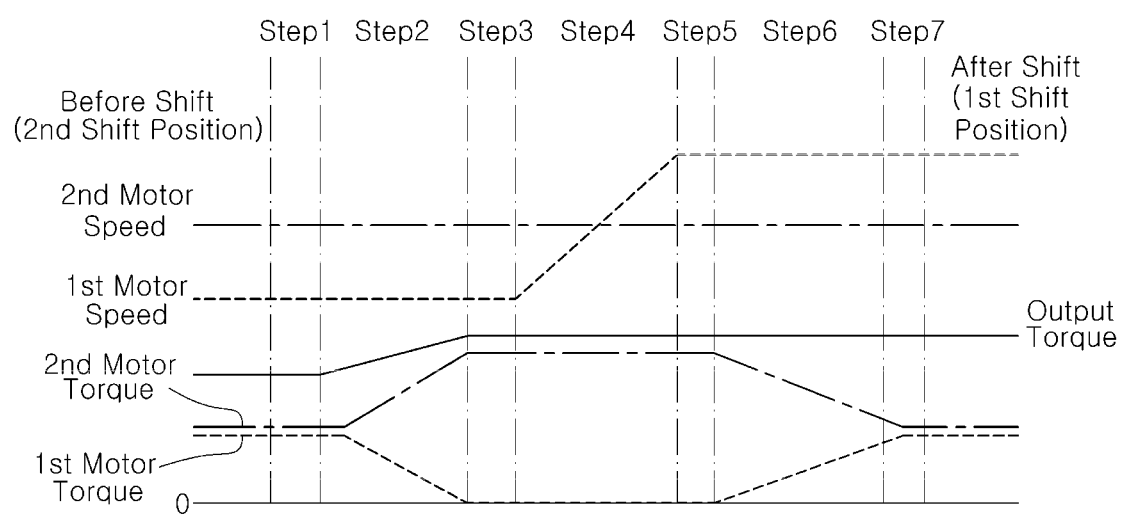
FIG. 8 is a graph illustrating the shift control method for an AMT according to the third form of the present disclosure.

For example, a power-on 2-1 downshift performed in a situation in which the driver has pressed the accelerator pedal may be described as being composed of a total of seven 7 steps as illustrated in FIG. 8.

In Step 1, the shift operation is started in response to generation of a shift command indicating a shift from the second shift position to the first shift position.

In Step 2, cooperative control of increasing the torque of the second motor MG2 so that the output torque of the output shaft OUT follows the early-increasing target torque while decreasing the torque of the first motor MG1 is performed, so that the first synchronization unit S1 releases the second driving gear D2 from the first input shaft IN1.

In the present form, differently from the first form, it is possible to increase the output torque to follow the early-increasing target torque instead of remaining constant, thereby further improving the feeling of acceleration of the vehicle.

Accordingly, the early-increasing target torque may be previously designed and set to an appropriate value by a plurality of experiments and analysis, depending on the characteristics of the corresponding vehicle type, so as to increase in proportion to the displacement of the accelerator pedal moved by the driver, the operation acceleration, or the like.

In Step 3, when the torque of the first motor MG1 is sufficiently decreased, the first synchronization unit S1 releases the second driving gear D2 from the first input shaft IN1.

Here, the torque of the second motor MG2 is maintained to be constant, so that the output torque of the output shaft OUT is maintained to be constant.

In Step 4, when the releasing of the second driving gear D2 from the first input shaft IN1 is completed and the second driving gear D2 is in the neutral position, the speed of the first motor MG1 is increased in order to synchronize the speed of the first driving gear D1 and the speed of the first input shaft IN1.

Here, the torque of the second motor MG2 is maintained to be constant, so that the output torque of the output shaft OUT is maintained to be constant.

In Step 5, when the speed of the first input shaft IN1 is synchronized with the speed of the first driving gear D1, the first driving gear D1 is directly connected to the first input shaft IN1 by the first synchronization unit S1.

Here, the torque of the second motor MG2 is maintained to be constant, so that the output torque of the output shaft OUT is maintained to be constant.

In Step 6, when the coupling between the first driving gear D1 and the first input shaft IN1 is completed, cooperative control of decreasing the torque of the second motor MG2 to reduce or minimize a change in the output torque in response to the change in the torque of the first motor MG1 while increasing the torque of the first motor MG1 is performed.

In Step 7, it may be appreciated that the shift from the second shift position to the first shift position is completed due to the control over the torque of the first motor MG1 and the torque of the second motor MG2 in Step 6.

According to the present disclosure, during the power-on downshift of the vehicle, the output torque output shaft OUT is increased in the early stage of the shift operation and then remains constant without torque interruption until the shift operation is finished. Consequently, the feeling of shifting of the vehicle may be improved and the feeling of acceleration may be obtained, so that the power performance of the vehicle may be significantly improved.

Figure 9:
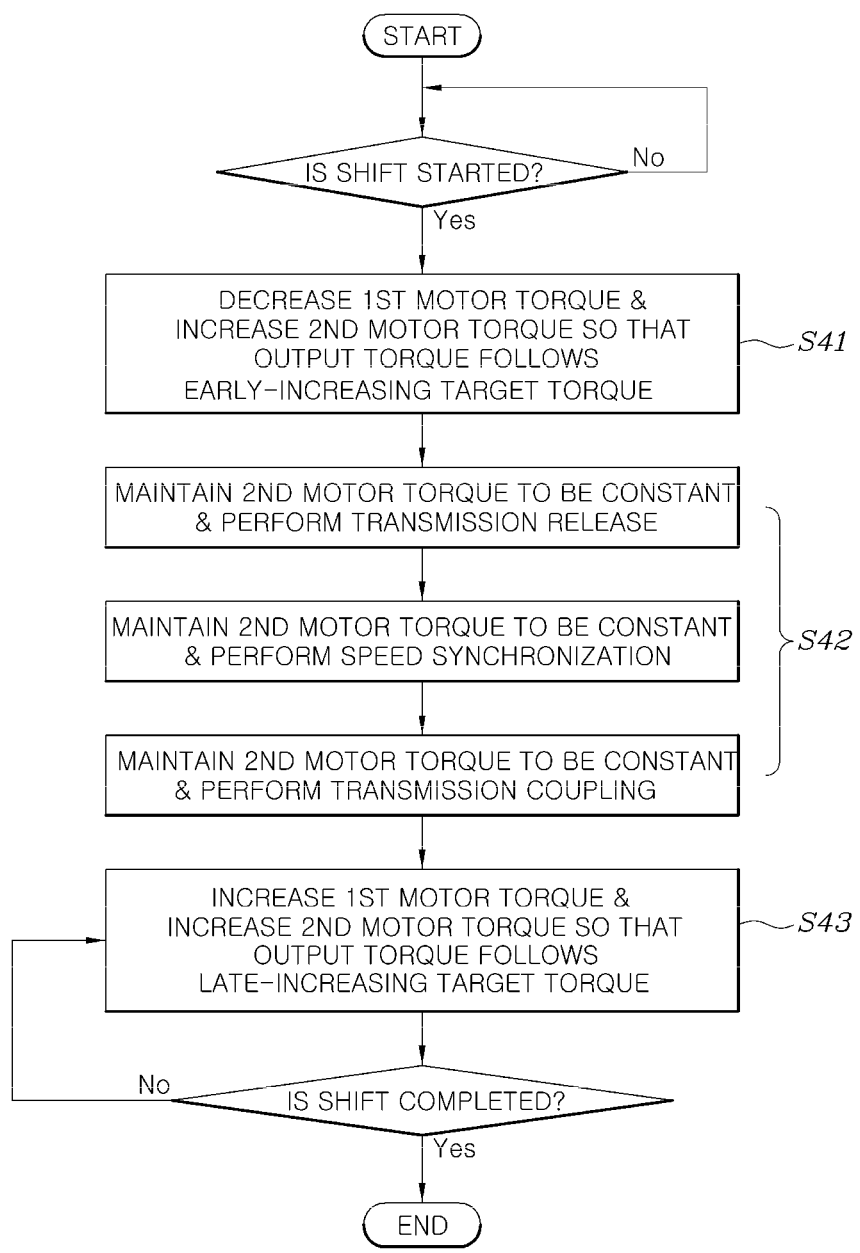
FIG. 9 is a flowchart illustrating a shift control method for an AMT according to a fourth form of the present disclosure.
Figure 10:
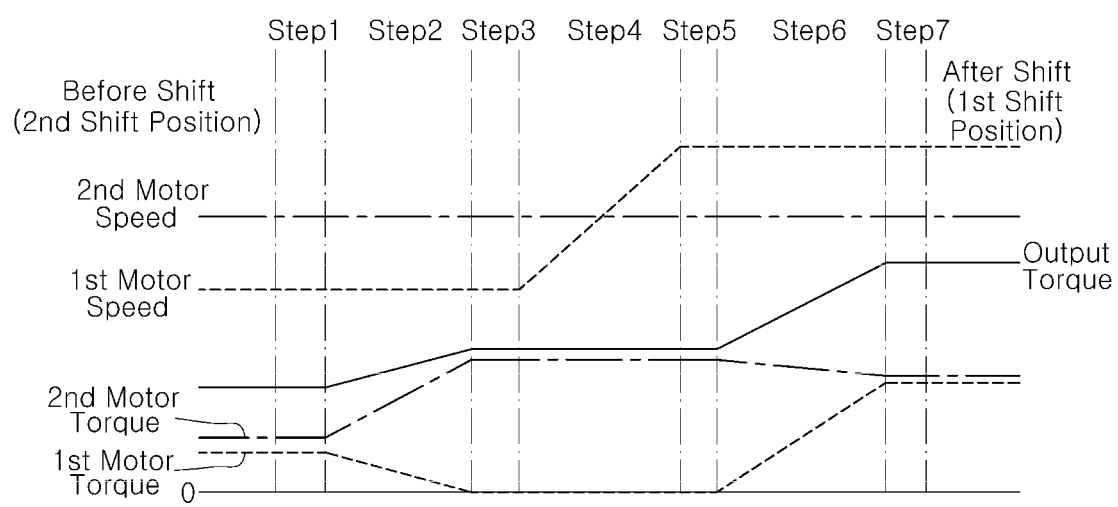
FIG. 10 is a graph illustrating the shift control method for an AMT according to the fourth form of the present disclosure.

Referring to FIGS. 9 and 10, the shift control method for an AMT of a vehicle according to the fourth form of the present disclosure includes: step S41 of, when a shift operation is started, increasing the torque of the second motor MG2 so that output torque of the output shaft OUT follows predetermined early-increasing target torque while decreasing the torque of the first motor MG1; step S32 of maintaining the increased torque of the second motor MG2 to be constant while performing control over transmission release, speed synchronization, and transmission coupling; and step S43 of, after the control over the transmission coupling is completed, controlling the torque of the second motor MG2 so that the output torque of the output shaft OUT follows predetermined late-increasing target torque while controlling the torque of the first motor MG1 to be increased.

For example, a power-on 2-1 downshift performed in a situation in which the driver has pressed the accelerator pedal may be described as being composed of a total of 7 steps as illustrated in FIG. 10.

Herein, only Step 2 and Step 6 from among the above-described 7 steps will be described, since the remaining steps except for Step 2 and Step 6 are the same as those of the first to third forms.

The present form differs from the first to third forms in that the output torque of the output shaft OUT is controlled to follow the early-increasing target torque and the late-increasing target torque in Step 2 and Step 6.

Thus, the output torque is controlled to follow the early-increasing target torque before the neutral position of the first synchronization unit S1 and follow the late-increasing target torque after the neutral position of the first synchronization unit S1, so that the vehicle may be accelerated in the early and late stages of the shift operation and the output torque may be maintained to be constant without torque interruption. Consequently, the feeling of shifting of the vehicle may be improved and the feeling of acceleration may be obtained, so that the power performance of the vehicle may be significantly improved.

The early-increasing target torque may be set to be greater than or equal to the maximum torque of the second motor MG2.

In this case, the second motor MG2 may be controlled to generate torque close to the maximum torque thereof, thereby further contributing in improving the feeling of acceleration of the vehicle.

In Step 6 illustrated in FIG. 10, the torque of the first motor MG1 may be insignificantly decreased while the torque of the first motor MG1 is being increased to follow the late-increasing target torque. This indicates that the torque of the second motor MG2 may be controlled to be maintained or decreased, depending on the magnitude of the late-increasing target torque, an increment in the torque of the first motor MG1, or the like.

That is, in a situation in which the torque of the second motor MG2 is increased to be the maximum torque in Step 2 in FIG. 10, due to the early-increasing target torque being set to be greater than or equal to the maximum torque of the second motor MG2, the maximum torque of the second motor MG2 is maintained during a period of from Step 3 to Step 5. In Step 6, the torque of the second motor MG2 is insignificantly decreased depending on the magnitude of the late-increasing target torque and the torque of the first motor MG1, and the output torque of the output shaft OUT follows the late-increasing target torque.

The late-increasing target torque may be set to be greater than or equal to the maximum torque of the second motor MG2.

Figure 11:
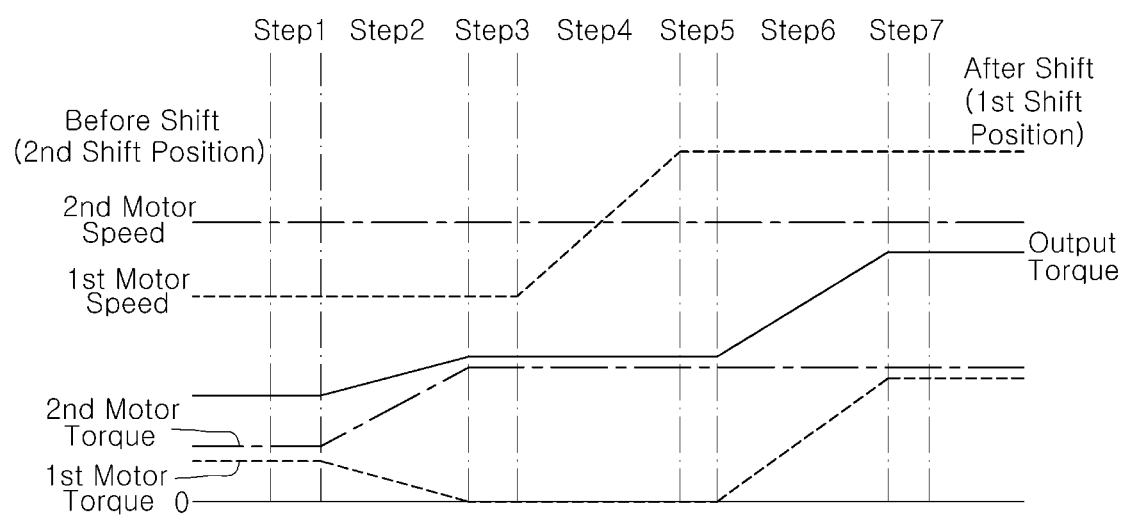
FIG. 11 is a graph illustrating a shift control method for an AMT according to a fifth form of the present disclosure.

That is, a fifth form illustrated in FIG. 11 is substantially the same as the fourth form, except that the late-increasing target torque is set to be greater than or equal to the maximum torque of the second motor MG2 in Step 6, and thus, the second motor MG2 is controlled so that the torque thereof is increased to the maximum torque in Step 2 and is continuously maintained to be the same even after Step 6.

Even in the case that the late-increasing target torque is set to be greater than the maximum torque of the second motor MG2, the second motor MG2 may be controlled by the maximum torque thereof, thereby obtaining the durability of the second motor MG2 and obtaining the maximum acceleration performance of the vehicle.

The 1-2 upshift operation and the 2-1 downshift operation in the transmission illustrated in FIG. 1 have been described hereinbefore. 2-3, 4-5, and 5-6 upshift operations may also be performed in substantially the same manner as in the above-described 1-2 upshift operation. In addition, 6-5, 5-4, and 3-2 downshift operations may also be performed in substantially the same manner as in the above-described 2-1 downshift operation.

The remaining 3-4 shift operation will be described with reference to FIG. 12.

In the third shift position, the second driving gear D2 is directly connected to the first input shaft IN1 by the first synchronization unit S1, the third driving gear D3 is directly connected to the second input shaft IN2 by the second synchronization unit S2, and the ring gear R is fixed to the transmission casing CS by the third transmission unit S3.

Figure 12:
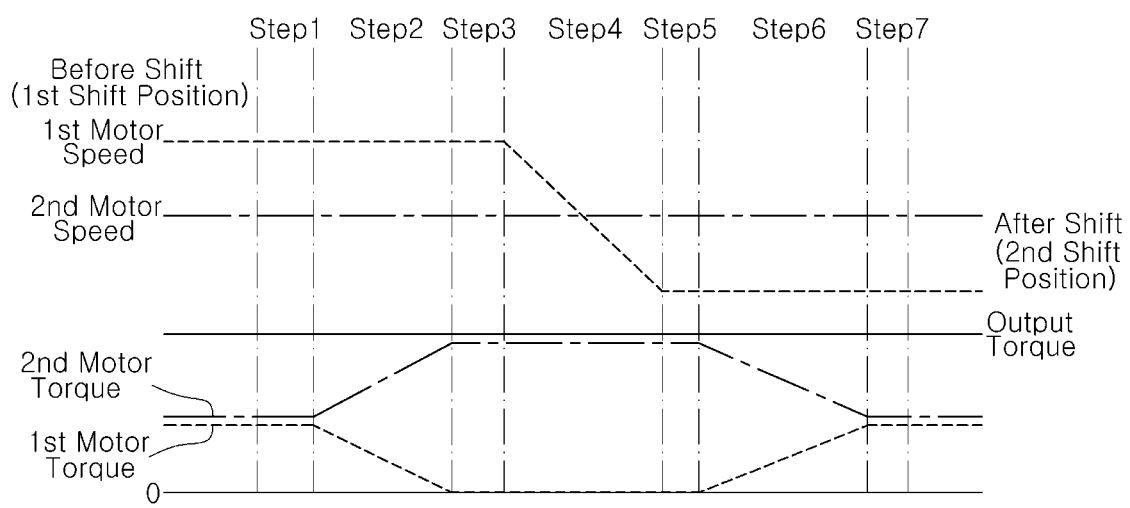
FIG. 12 is a graph illustrating a shift control method for an AMT according to a sixth form of the present disclosure.

In FIG. 12, the power-on 3-4 upshift operation is illustrated as being composed of Step 1 to Step 7.

In Step 1, the shift operation is started in response to generation of an upshift command indicating an upshift to the fourth shift position.

In Step 2, cooperative control of increasing the torque of the second motor MG2 to prevent or compensate for a decrease in torque output via the output shaft OUT in response to a change in the torque of the first motor MG1 while decreasing the torque of the first motor MG1 is performed, so that the first synchronization unit S1 releases the first driving gear D2 from the first input shaft IN1.

In Step 3, when the decreasing of the torque of the first motor MG1 is completed, the first synchronization unit S1 releases the second driving gear D2 from the first input shaft IN1 and the third transmission unit S3 releases the ring gear R from the transmission casing CS while the level of the torque of the second motor MG2 finally increased in Step 2 is being maintained to reduce or minimize a change in the output torque.

In Step 4, the third transmission unit S3 directly connects the ring gear R to the carrier C and the speed of the first motor MG1 is reduced to synchronize the speed of the second driving gear D2 and the speed of the first input shaft IN1 while the level of the torque of the second motor MG2 is being maintained to be the same as that in Step 3 in order to reduce or minimize a change in the output torque of the output shaft OUT.

In Step 5, when the speed of the first input shaft IN1 is synchronized with the speed of the second driving gear D2, the first synchronization unit S1 directly connects the second driving gear D2 to the first input shaft IN1.

Here, the torque of the second motor MG2 is maintained to be constant, so that the output torque of the output shaft OUT is maintained to be constant.

In Step 6, when the coupling between the second driving gear D2 and the first input shaft IN1 is completed, cooperative control of decreasing the torque of the second motor MG2 to reduce or minimize a change in the output torque in response to the change in the torque of the first motor MG1 while increasing the torque of the first motor MG1 is performed.

In Step 7, it may be appreciated that the shift to the fourth shift position is completed due to the control over the torque of the first motor MG1 and the torque of the second motor MG2 in Step 6.

Figure 13:
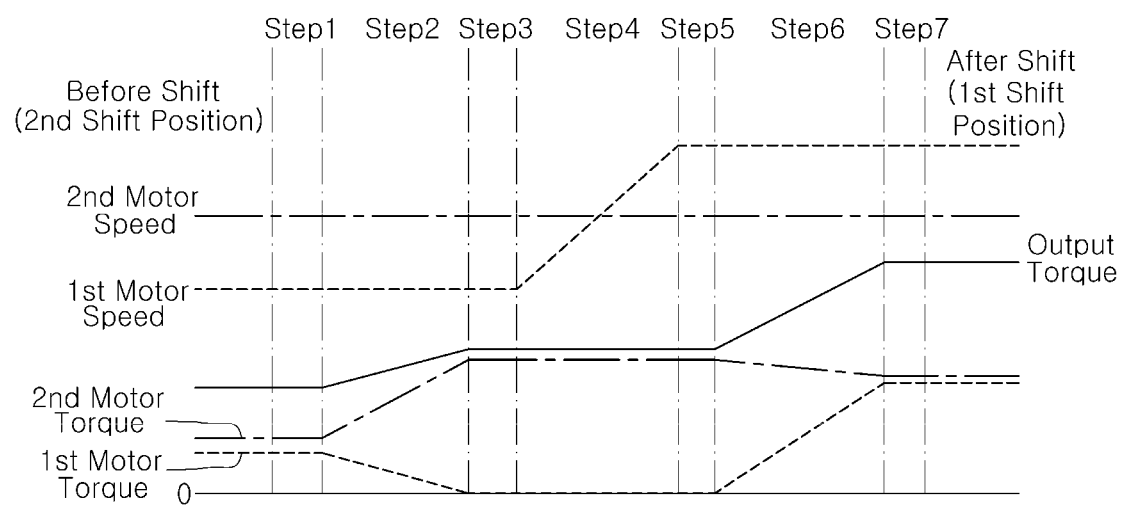
FIG. 13 is a graph illustrating a shift control method for an AMT according to a seventh form of the present disclosure.

Finally, FIG. 13 illustrates a power-on 4-3 downshift operation composed of Step 1 to Step 7.

In Step 1, the shift operation is started in response to generation of a downshift command indicating a downshift to the third shift position.

In Step 2, cooperative control of increasing the torque of the second motor MG2 so that the output torque of the output shaft OUT follows the early-increasing target torque while decreasing the torque of the first motor MG1 is performed, so that the first synchronization unit S1 releases the first driving gear D1 from the first input shaft IN1.

Here, the torque of the second motor MG2 may be increased to be the maximum torque of the second motor MG2.

In Step 3, when the torque of the first motor MG1 is sufficiently decreased, the second motor MG2 maintains the torque to be the level finally increased in Step 2 in order to reduce or minimize a change in the output torque, the first synchronization unit S1 releases the first driving gear D1 from the first input shaft IN1, and the third transmission unit S3 releases the ring gear R from the carrier C to which the ring gear R has been directly connected.

In Step 4, when the first driving gear D1 is released from the first input shaft IN1 and the ring gear R is released from the carrier C, the third transmission unit S3 fixes the ring gear R to the transmission casing CS and the speed of the first motor MG1 is increased so that the speed of the second driving gear D2 and the speed of the first input shaft IN1 may be synchronized while the second motor MG2 is maintaining the level of the torque to be constant subsequent to Step 3 in order to reduce or minimize a change in the output torque of the output shaft OUT.

In Step 5, when the speed of the second driving gear D2 and the speed of the first input shaft IN1 are synchronized, the first synchronization unit S1 couples the second driving gear D2 to the first input shaft IN1 while the second motor MG2 is maintaining the level of the torque to be constant subsequent to Step 4 in order to reduce or minimize a change in the output torque.

Figure 3:
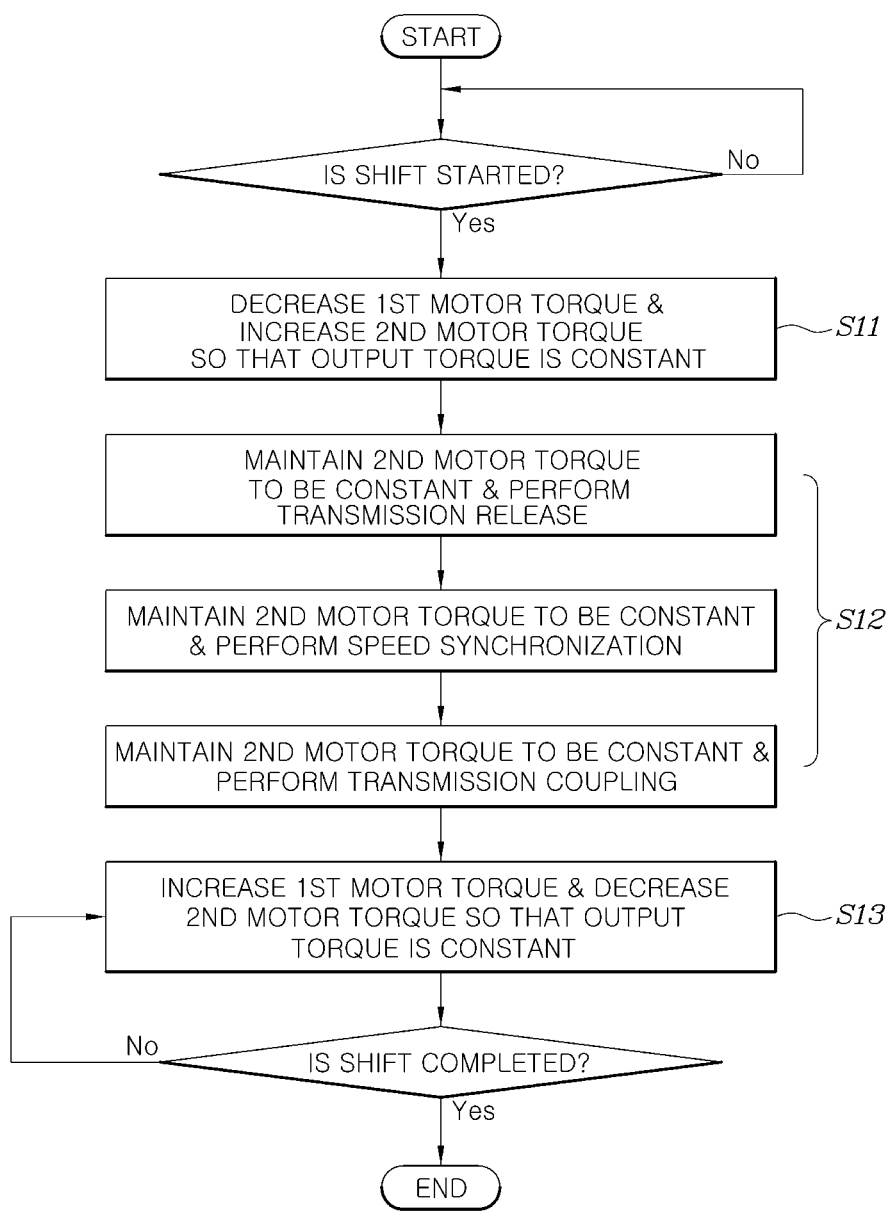
FIG. 3 is a flowchart illustrating a shift control method for an AMT according to a first form of the present disclosure.

In Step 6, when the coupling between the second driving gear D2 and the first input shaft IN1 is completed, the torque of the first motor MG1 is increased, and the torque of the second motor MG2 is controlled so that the output torque of the output shaft OUT follows the late-increasing target torque. In FIG. 3, the torque of the second motor MG2 is insignificantly decreased.

In Step 7, it may be appreciated that the shift to the third shift position is completed due to the control over the torque of the first motor MG1 and the torque of the second motor MG2 in Step 6.

In addition, a shift control method similar to those of the first and second forms, except that the function of the first motor MG1 and the function of the second motor MG2 are exchanged, may be provided. Also provided is a shift control method for an AMT of a vehicle according to an eighth form of the present disclosure. The AMT includes the first motor MG1, the second motor MG2, and the planetary gear unit PG, in which the first motor MG1 may supply power to the first rotating element of the planetary gear unit PG, the second motor MG2 may supply power to the first rotating element or the second rotating element of the planetary gear unit PG, the second rotating element being coupled to the output shaft OUT, and power output from the first motor MG1 and power output from the second motor MG2 are combined together via the planetary gear unit PG.

The shift control method may include: a step of, when a shift operation is started, increasing the torque of the first motor MG1 so that a change in output torque of the output shaft OUT due to a change in the torque of the second motor MG2 is reduced or minimized while decreasing the torque of the second motor MG2; a step of maintaining the increased torque of the first motor MG1 to be constant while performing control over transmission release, speed synchronization, and transmission coupling; and a step of, after the control over the transmission coupling is completed, controlling the torque of the first motor MG1 so that the output torque of the output shaft OUT follows predetermined target torque while controlling the torque of the second motor MG2 to be increased.

Here, the target torque that the output torque of the output shaft OUT follows may be continuously maintained to be a constant value from previous steps.

In addition, the target torque that the output torque of the output shaft OUT follows may be predetermined late-increasing target torque that is gradually increased.

In addition, a shift control method similar to those of the third and fourth forms, except that the function of the first motor MG1 and the function of the second motor MG2 are exchanged, may be provided. Also provided is a shift control method for an AMT of a vehicle according to a ninth form of the present disclosure. The AMT includes the first motor MG1, the second motor MG2, and the planetary gear unit PG, in which the first motor MG1 may supply power to the first rotating element of the planetary gear unit PG, the second motor MG2 may supply power to the first rotating element or the second rotating element of the planetary gear unit PG, the second rotating element being coupled to the output shaft OUT, and power output from the first motor MG1 and power output from the second motor MG2 are combined together via the planetary gear unit PG.

The shift control method may include: a step of, when a shift operation is started, increasing the torque of the first motor MG1 so that output torque of the output shaft OUT follows predetermined early-increasing target torque while decreasing the torque of the second motor MG2; a step of maintaining the increased torque of the first motor MG1 to be constant while performing control over transmission release, speed synchronization, and transmission coupling; and a step of, after the control over the transmission coupling is completed, controlling the torque of the first motor MG1 so that the output torque of the output shaft OUT follows predetermined target torque while controlling the torque of the second motor MG2 to be increased.

Here, the target torque that the output torque of the output shaft OUT follows may be continuously maintained to be a constant value from previous steps.

In addition, the target torque that the output torque of the output shaft OUT follows may be predetermined late-increasing target torque that is gradually increased.

Although the specific forms of the present disclosure have been described for illustrative purposes, those skilled in the art will appreciate that various modifications, additions and substitutions are possible, without departing from the scope and spirit of the present disclosure.

What is claimed is:

1. A shift control method for an automated manual transmission (AMT) comprising a first motor, a second motor, and a planetary gear unit, where the first motor supplies power to a first rotating element of the planetary gear unit, the second motor supplies power to the first rotating element or a second rotating element of the planetary gear unit, the second rotating element being coupled to an output shaft, and power output from the first motor and power output from the second motor are combined together via the planetary gear unit, the shift control method comprising:

in response to a shift operation, increasing a torque supplied to the first rotating element or the second rotating element of the planetary gear unit from the second motor while decreasing a torque supplied to the first rotating element of the planetary gear unit from the first motor so that a change in an output torque of the output shaft due to a change in the torque supplied to the first rotating element of the planetary gear unit from the first motor is reduced;

maintaining the increased torque supplied to the first rotating element or the second rotating element of the planetary gear unit from the second motor to be constant while performing a control over transmission release, speed synchronization, and transmission coupling; and after the control over the transmission coupling is completed, controlling the torque supplied to the first rotating element or the second rotating element of the planetary gear unit from the second motor while controlling the torque supplied to the first rotating element of the planetary gear unit from the first motor to be increased so that the output torque of the output shaft follows a predetermined target torque.

2. The shift control method of claim 1, wherein the predetermined target torque is maintained to be a constant value.

3. The shift control method of claim 1, wherein the predetermined target torque is a late-increasing target torque that is gradually increased.

4. A shift control method for an automated manual transmission (AMT) comprising a first motor, a second motor, and a planetary gear unit, where the first motor supplies power to a first rotating element of the planetary gear unit, the second motor supplies power to the first rotating element or a second rotating element of the planetary gear unit, the second rotating element being coupled to an output shaft, and power output from the first motor and power output from the second motor are combined together via the planetary gear unit, the shift control method comprising:

in response to a shift operation, increasing a torque supplied to the first rotating element or the second rotating element of the planetary gear unit from the second motor so that an output torque of the output shaft follows a predetermined early-increasing target torque while decreasing a torque supplied to the first rotating element of the planetary gear unit from the first motor;

maintaining the increased torque supplied to the first rotating element or the second rotating element of the planetary gear unit from the second motor to be constant while performing a control over transmission release, speed synchronization, and transmission coupling; and after the control over the transmission release is completed, controlling the torque supplied to the first rotating element or the second rotating element of the planetary gear unit from the second motor so that the output torque of the output shaft follows a predetermined target torque while controlling the torque supplied to the first rotating element of the planetary gear unit from the first motor to be increased.

5. The shift control method of claim 4, wherein the predetermined target torque is maintained to be a constant value.

6. The shift control method of claim 4, wherein the predetermined target torque is a late-increasing target torque that is gradually increased.

7. The shift control method of claim 6, wherein the predetermined early-increasing target torque is set to be greater than or equal to a maximum torque supplied to the first rotating element or the second rotating element of the planetary gear unit from the second motor.

8. The shift control method of claim 6, wherein the late-increasing target torque is set to be greater than or equal to a maximum torque supplied to the first rotating element or the second rotating element of the planetary gear unit from the second motor.

9. The shift control method of claim 8, wherein, even in a case that the late-increasing target torque is set to be greater than the maximum torque supplied to the first rotating element or the second rotating element of the planetary gear unit from the second motor, the second motor is controlled by the maximum torque thereof.

10. A shift control method for an automated manual transmission (AMT) comprising a first motor, a second motor, and a planetary gear unit, where the first motor supplies power to a first rotating element of the planetary gear unit, the second motor supplies power to the first rotating element or a second rotating element of the planetary gear unit, the second rotating element being coupled to an output shaft, and power output from the first motor and power output from the second motor are combined together via the planetary gear unit, the shift control method comprising:

in response to a shift operation, increasing a torque supplied to the first rotating element of the planetary gear unit from the first motor so that a change in an output torque of the output shaft due to a change in a torque supplied to the first rotating element or the second rotating element of the planetary gear unit from the second motor is minimized while decreasing the torque supplied to the first rotating element or the second rotating element of the planetary gear unit from the second motor;

maintaining the increased torque supplied to the first rotating element of the planetary gear unit from the first motor to be constant while performing a control over transmission release, speed synchronization, and transmission coupling; and after the control over the transmission release is completed, controlling the torque supplied to the first rotating element of the planetary gear unit from the first motor so that the output torque of the output shaft follows a predetermined target torque while controlling the torque supplied to the first rotating element or the second rotating element of the planetary gear unit from the second motor to be increased.

11. The shift control method of claim 10, wherein the predetermined target torque is maintained to be a constant value.

12. The shift control method of claim 10, wherein the predetermined target torque is a late-increasing target torque that is gradually increased.

* * * * *